(12) United States Patent
Biswas et al.

(10) Patent No.: US 9,141,568 B2
(45) Date of Patent: Sep. 22, 2015

(54) PROPORTIONAL MEMORY OPERATION THROTTLING

(75) Inventors: Sukalpa Biswas, Fremont, CA (US); Hao Chen, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 13/217,513

(22) Filed: Aug. 25, 2011

(65) Prior Publication Data
US 2013/0054901 A1    Feb. 28, 2013

(51) Int. Cl.
*G06F 12/00*    (2006.01)
*G06F 13/16*    (2006.01)

(52) U.S. Cl.
CPC .................................. *G06F 13/1642* (2013.01)

(58) Field of Classification Search
CPC ............ G06F 2212/7211; G06F 12/00; G06F 13/1668
USPC .................................................. 711/103, 147
See application file for complete search history.

(56) References Cited

U.S. PATENT DOCUMENTS

| | | | |
|---|---|---|---|
| 5,581,703 A | 12/1996 | Baugher | |
| 5,719,800 A | 2/1998 | Mittal et al. | |
| 6,470,238 B1 * | 10/2002 | Nizar et al. | 700/299 |
| 6,597,691 B1 | 7/2003 | Anderson | |
| 6,628,609 B2 | 9/2003 | Chapman | |
| 6,826,704 B1 | 11/2004 | Pickett | |
| 6,947,970 B2 | 9/2005 | Berry | |
| 6,965,563 B1 | 11/2005 | Hospodor | |
| 7,054,968 B2 | 5/2006 | Shrader et al. | |
| 7,145,904 B2 | 12/2006 | Zhao | |
| 7,155,554 B2 | 12/2006 | Vinogradov | |
| 7,277,975 B2 | 10/2007 | Vinogradov | |
| 7,350,028 B2 | 3/2008 | Cameron | |
| 7,548,545 B1 | 6/2009 | Wittenschlaeger | |
| 7,570,651 B2 | 8/2009 | Haghighi | |
| 7,594,042 B2 * | 9/2009 | Lim | 710/23 |
| 7,596,139 B2 | 9/2009 | Patel | |
| 7,660,931 B2 | 2/2010 | Hayter | |
| 7,715,377 B2 | 5/2010 | Mick | |
| 7,912,951 B2 | 3/2011 | Gulati et al. | |
| 7,937,563 B2 | 5/2011 | Naffziger et al. | |
| 7,941,578 B2 | 5/2011 | Kimoto et al. | |
| 2002/0085590 A1 * | 7/2002 | Booth | 370/535 |

(Continued)

OTHER PUBLICATIONS

U.S. Appl. No. 13/008,180 entitled "Quality of Service (QoS)-Related Fabric Control" filed Jan. 18, 2011.

(Continued)

*Primary Examiner* — Jared Rutz
*Assistant Examiner* — Christopher Do
(74) *Attorney, Agent, or Firm* — Rory D. Rankin; Meyertons, Hood, Kivlin, Kowert & Goetzel, P.C.

(57) ABSTRACT

A memory controller receives memory operations via an interface which may include multiple ports. Each port is coupled to real-time or non-real-time requestors, and the received memory operations are classified as real-time or non-real-time and stored in queues prior to accessing memory. Within the memory controller, pending memory operations from the queues are scheduled for servicing. Logic throttles the scheduling of non-real-time memory operations in response to detecting a number of outstanding memory operations has exceeded a threshold. The throttling is proportional to the number of outstanding memory operations.

23 Claims, 9 Drawing Sheets

(56) References Cited

U.S. PATENT DOCUMENTS

| | | | |
|---|---|---|---|
| 2002/0181395 A1* | 12/2002 | Foster et al. | ............ 370/229 |
| 2004/0017820 A1 | 1/2004 | Garinger | |
| 2005/0052992 A1 | 3/2005 | Cloonan | |
| 2006/0092944 A1 | 5/2006 | Wingard | |
| 2006/0123169 A1 | 6/2006 | Chai et al. | |
| 2008/0069125 A1 | 3/2008 | Reed | |
| 2008/0298397 A1 | 12/2008 | Kwan | |
| 2009/0138682 A1 | 5/2009 | Capps, Jr. et al. | |
| 2009/0207866 A1 | 8/2009 | Cholas et al. | |
| 2010/0005470 A1 | 1/2010 | Simon et al. | |
| 2010/0106820 A1* | 4/2010 | Gulati et al. | ............ 709/224 |
| 2010/0169525 A1 | 7/2010 | Natanel et al. | |
| 2010/0191993 A1 | 7/2010 | Chaudhry et al. | |
| 2010/0278195 A1 | 11/2010 | Wagh | |
| 2010/0318713 A1 | 12/2010 | Deshpande | |
| 2011/0072178 A1 | 3/2011 | Mace | |
| 2011/0231604 A1* | 9/2011 | Taguchi et al. | ............ 711/114 |

OTHER PUBLICATIONS

U.S. Appl. No. 13/008,156 entitled "Write Traffic Shaper Circuits" filed Jan. 18, 2011.

U.S. Appl. No. 13/008,184 entitled "Hierarchical Fabric Control Circuits" filed Jan. 18, 2011.

Bolotin E et al: "QNoC: QoS architecture 1-12 and design process for Network on Chip", Journal of Systems Architecture, Elsevier BV, N L, vol. 50, Feb. 28, 2004, pp. 1-18, XP882619446, ISSN: 1383-7621 * Chapter I and II *.

Maze et al: "Reconfigurable Issue Logic for Microprocessor Power/Performance Throttling"; Downloaded from the Internet; http://groups.csail.mit.edu/cag/6.893-f2000/project/maze_check1.pdf; downloaded on Apr. 12, 2011.

Zhang, et al.: "Hardward Execution Throttling for Multi-core Resource Management"; • Proceeding, USENIX'09, Proceedings of the 2009 conference on USENIX Annual technical conference, pp. 23-23, USENIX Association Berkeley, CA, USA, 2009.

International Search Report & Written Opinion from PCT/US2012/02057 dated Mar. 19, 2012.

U.S. Appl. No. 13/008,171 entitled "Fabric Limiter Circuits" filed Jan. 18, 2011.

Search report in application No. EP 12150817.0-2416 mailed Mar. 2, 2012.

U.S. Appl. No. 13/285,361 entitled "Processor Instruction Issue Throttling" filed Oct. 31, 2011.

U.S. Appl. No. 13/221,461 entitled "Accelerating Blocking Memory Operations" filed Aug. 30, 2011.

* cited by examiner

PROPORTIONAL MEMORY OPERATION THROTTLING

BACKGROUND

1. Field of the Invention

This invention is related to the field of memory controllers.

2. Description of the Related Art

Digital systems generally include a memory system formed from semiconductor memory devices such as static random access memory (SRAM), dynamic random access memory (DRAM), synchronous DRAM (SDRAM), double data rate (DDR, DDR2, DDR3, etc.) SDRAM including low power versions (LPDDR, LPDDR2, etc.) SDRAM, etc. The memory system is volatile, retaining data when powered on but not when powered off, but also provides low latency access as compared to nonvolatile memories such as Flash memory, magnetic storage devices such as disk drives, or optical storage devices such a compact disk (CD), digital video disk (DVD), and BluRay drives.

The memory devices forming the memory system have a low level interface to read and write the memory according to memory device-specific protocols. The sources that generate memory operations typically communicate via a higher level interface such as a bus, a point-to-point packet interface, etc. The sources can be processors, peripheral devices such as input/output (I/O) devices, audio and video devices, etc. Generally, the memory operations include read memory operations to transfer data from the memory to the device and write memory operations to transfer data from the source to the memory. The term "transaction" may be used interchangeably with "memory operation" throughout this disclosure. Additionally, "read memory operations" may be more succinctly referred to herein as "read operations" or "reads", and similarly "write memory operations" may be more succinctly referred to herein as "write operations" or "writes".

Accordingly, a memory controller is typically included to receive the memory operations from the higher level interface and to control the memory devices to perform the received operations. The memory controller generally also includes queues to capture the memory operations, and can include circuitry to improve performance. For example, some memory controllers schedule read memory operations ahead of earlier write memory operations that affect different addresses.

In certain situations, as the amount of memory operations received by the memory controller increases, the latency experienced by the memory operations also increases. For real-time memory operations, increased latency may result in a significant degradation of performance.

SUMMARY

Systems, methods, and apparatus for servicing operations are contemplated. In one embodiment, a memory controller includes an interface via which a plurality of memory operations are received from one or more sources. The received memory operations include operations of at least both a first type of operation and a second type of operation. The received operations are stored in one or more queues. The memory controller includes logic that is configured to monitor a number of outstanding memory operations stored in said queues. In response to detecting a given condition, the logic is configured to schedule only memory operations of the first type for servicing during a given period of time. In various embodiments, a duration of the time period is proportional to a number of pending operations stored in the queues. In various embodiments, operations of the first type are real-time (RT) memory requests/operations, and operations of the second type are non real-time (NRT) memory operations.

In one embodiment, when it is detected that the number of outstanding memory operations in one or more queues has exceeded a pre-determined threshold, NRT memory operations may be throttled by temporarily ceasing to service the NRT operations or otherwise reducing the number or rate of NRT operations serviced. The throttling may be proportional to the number of outstanding memory operations in one or more queues. In other embodiments, other conditions may trigger a throttling of NRT memory operations.

BRIEF DESCRIPTION OF THE DRAWINGS

The following detailed description makes reference to the accompanying drawings, which are now briefly described.

Figure 1:
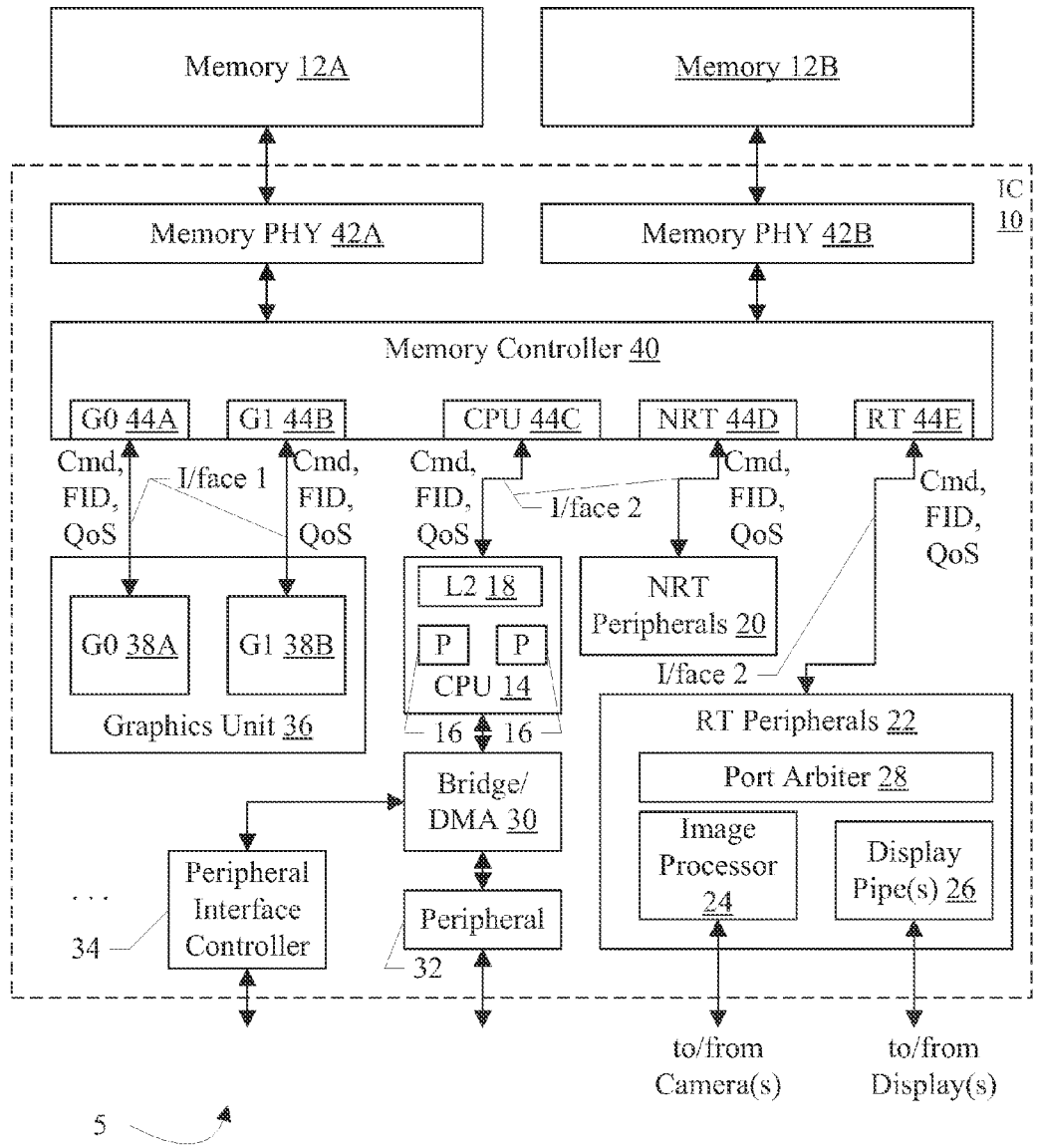
FIG. 1 is a block diagram of one embodiment of a system including a memory controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment". The appearance of the phrase "in one embodiment" in different contexts does not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor unit . . . . " Such a claim does not foreclose the system from including additional components (e.g., a memory device, input device, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

DETAILED DESCRIPTION OF EMBODIMENTS

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real-time (NRT) peripherals 20 and a set of one or more real-time (RT) peripherals 22. In the illustrated embodiment, the RT peripherals include an image processor 24, one or more display pipes 26, and a port arbiter 28. Other embodiments may include more or fewer image processors 24, more or fewer display pipes 26, and/or any additional real time peripherals as desired. The image processor 24 may be coupled to receive image data from one or more cameras in the system 5. Similarly, the display pipes 26 may be coupled to one or more display controllers (not shown) which control one or more displays in the system. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively via a first type of interface (I/face 1). The CPU block 14 is coupled to the port 44C via a second type of interface (I/face 2). The NRT peripherals 20 and the RT peripherals 22 are coupled to the ports 44D-44E, respectively, via the second type of interface. The number of ports included in a memory controller 40 may be varied in other embodiments, as may the number of memory controllers. The number of memory PHYs 42A-42B and corresponding memories 12A-12B may be one or more than two in other embodiments.

In one embodiment, each port 44A-44E may be associated with a particular type of traffic. For example, in one embodiment, the traffic types may include RT traffic, NRT traffic, and graphics traffic. Other embodiments may include other traffic types in addition to, instead of, or in addition to a subset of the above traffic types. Each type of traffic may be characterized differently (e.g., in terms of requirements and behavior), and the memory controller may handle the traffic types differently to provide higher performance based on the characteristics. For example, RT traffic requires servicing of each memory operation within a specific amount of time. If the latency of the operation exceeds the specific amount of time, erroneous operation may occur in the RT peripheral. For example, image data may be lost in the image processor 24 or the displayed image on the displays to which the display pipes 26 are coupled may visually distort. RT traffic may be characterized as isochronous, for example. On the other hand, graphics traffic may be relatively high bandwidth, but is not latency-sensitive. NRT traffic, such as from the processors 16, is more latency-sensitive for performance reasons but survives higher latency. That is, NRT traffic may generally be serviced with a larger latency than RT traffic without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g., traffic to storage devices such as magnetic, optical, or solid state storage).

By providing ports 44A-44E associated with different traffic types, the memory controller 40 may be exposed to the different traffic types in parallel, and may thus be capable of making better decisions about which memory operations to service prior to others based on traffic type. In some embodiments, each port may be dedicated exclusively to either RT or NRT traffic. In other embodiments, the ports may be associated with the particular traffic type, but other traffic types may be supported on the port. In an embodiment, graphics traffic may be considered to be NRT traffic, but having visibility to the graphics traffic separate from other NRT traffic may be useful for bandwidth balancing among the other NRT sources and the RT source. Similarly, having the processor traffic separate from the other NRT sources may be useful in bandwidth balancing. In the illustrated embodiment, the RT port 44E may be associated with RT traffic and the remaining ports 44A-44D may be associated with NRT traffic.

Generally, a port may be a communication point on the memory controller 40 to communicate with one or more sources. In some cases, the port may be dedicated to a source (e.g., the ports 44A-44B may be dedicated to the graphics controllers 38A-38B, respectively). In other cases, the port may be shared among multiple sources (e.g., the processors 16 may share the CPU port 44C, the NRT peripherals 20 may share the NRT port 44D, and the RT peripherals such as the display pipes 26 and the image processor 24 may share the RT port 44E. A port may be coupled to a single interface to communicate with the one or more sources. Thus, when sources share an interface, there may be an arbiter on the sources' side of the interface to select between the sources. For example, the L2 cache 18 may serve as an arbiter for the CPU port 44C to the memory controller 40. The port arbiter 28 may serve as an arbiter for the RT port 44E, and a similar port arbiter (not shown) may be an arbiter for the NRT port 44D. The single source on a port or the combination of sources on a port may be referred to as an agent.

Each port 44A-44E is coupled to an interface to communicate with its respective agent. The interface may be any type of communication medium (e.g., a bus, a point-to-point interconnect, etc.) and may implement any protocol. In some embodiments, the ports 44A-44E may all implement the same interface and protocol. In other embodiments, different ports may implement different interfaces and/or protocols. For example, the embodiment illustrated in FIG. 1 includes the graphics controllers 38A-38B using one type of interface/protocol and the CPU block 14, the NRT peripherals 20 and the RT peripherals 22 using another type of interface/protocol. An interface may refer to the signal definitions and electrical properties of the interface, and the protocol may be the logical definition of communications on the interface (e.g., including commands, ordering rules, coherence support if any, etc.). Supporting more than one interface on the various ports 44A-44E may eliminate the need to convert from one interface supported by a source/agent and the interface supported by the memory controller 40, which may improve performance in some embodiments. Additional, some embodiments of the integrated circuit 10 may include circuitry purchased from a third party as a prepackaged unit typically referred to in the industry as intellectual property (IP). The IP may be "hard" (in which case it is specified as a netlist of circuits that are laid out and placed on the IC as a block) or "soft" (in which case it is specified as a synthesizable block that can be synthesized with other blocks to be included in the integrated circuit 10). Both soft and hard IP include a specified interface and protocol, which generally cannot be changed by the designer of the integrated circuit 10 (at least without payment of fees to the third party that owns the IP). Accordingly, supporting multiple interfaces/protocols may permit easier inclusion of third party IP.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. For example, each of the interfaces to the ports 44A-44E in FIG. 1 are shown to include a command (Cmd), a flow identifier (FID), and a QoS parameter (QoS). The command may identify the memory operation (e.g., read or write). A read command/memory operation causes a transfer of data from the memory 12A-12B to the source, whereas a write command/memory operation causes a transfer of data from the source to the memory 12A-12B. Commands may also include commands to program the memory controller 40. For example, which address ranges are mapped to which memory channels, bandwidth sharing parameters, etc. may all be programmable in the memory controller 40. The FID may identify a memory operation as being part of a flow of memory operations. A flow of memory operations may generally be related, whereas memory operations from different flows, even if from the same source, may not be related. A portion of the FID (e.g., a source field) may identify the source, and the remainder of the FID may identify the flow (e.g., a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. Sources that group transactions as a flow, however, may use the FIDs differently. Alternatively, flows may be correlated to the source field (e.g., operations from the same source may be part of the same flow and operations from a different source are part of a different flow). The ability to identify transactions of a flow may be used in a variety of ways described below (e.g., QoS upgrading, reordering, etc.).

Thus, a given source may be configured to use QoS parameters to identify which memory operations are more important to the source (and thus should be serviced prior to other memory operations from the same source), especially for sources that support out-of-order data transmissions with respect to the address transmissions from the source. Furthermore, the QoS parameters may permit sources to request higher levels of service than other sources on the same port and/or sources on other ports.

In some embodiments, different traffic types may have different definitions of QoS parameters. That is, the different traffic types may have different sets of QoS parameters. The meaning of a given QoS parameter value depends on the set of QoS parameters from which it is drawn. For example, a set of RT QoS parameters may be defined and a set of NRT QoS parameters may be defined. Thus, an RT QoS parameter value is assigned meaning within the RT QoS parameter set and an NRT QoS parameter value is assigned meaning within the NRT QoS parameter set. Other embodiments may implement the same QoS parameter set on all ports or among all traffic types.

The memory controller 40 may be configured to process the QoS parameters received on each port 44A-44E and may use the relative QoS parameter values to schedule memory operations received on the ports with respect to other memory operations from that port and with respect to other memory operations received on other ports. More specifically, the memory controller 40 may be configured to compare QoS parameters that are drawn from different sets of QoS parameters (e.g., RT QoS parameters and NRT QoS parameters) and may be configured to make scheduling decisions based on the QoS parameters.

The QoS parameters may thus be values that are transmitted with memory operations, and which may be used in the memory controller to identify requested QoS levels. The QoS levels may be relative to other levels, and may specify which memory operations are preferred to be selected prior to others having lower QoS levels. Thus, the QoS levels may function as a sort of priority after interpretation by the memory controller 40 to consider QoS levels defined in different sets, although the priority can be balanced by other factors.

In some embodiments, the memory controller 40 may be configured to upgrade QoS levels for pending memory operations. Various upgrade mechanisms may be supported. For example, the memory controller 40 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 40 may be configured to push pending memory operations from the same port or source, but not the same flow, as a newly received memory operation specifying a higher QoS level. As another example, the memory controller 40 may be configured to couple to a sideband interface from one or more agents, and may upgrade QoS levels responsive to receiving an upgrade request on the sideband interface. In another example, the memory controller 40 may be configured to track the relative age of the pending memory operations. The memory controller 40 may be configured to upgrade the QoS level of aged memory operations at certain ages. The ages at which upgrade occurs may depend on the current QoS parameter of the aged memory operation.

The memory controller 40 may be configured to determine the memory channel addressed by each memory operation received on the ports, and may be configured to transmit the memory operations to the memory 12A-12B on the corresponding channel. The number of channels and the mapping of addresses to channels may vary in various embodiments and may be programmable in the memory controller. The memory controller may use the QoS parameters of the memory operations mapped to the same channel to determine an order of memory operations transmitted into the channel. That is, the memory controller may reorder the memory operations from their original order of receipt on the ports. Additionally, during processing in the channel, the memory operations may be reordered again at one or more points. At each level of reordering, the amount of emphasis placed on the QoS parameters may decrease and factors that affect memory bandwidth efficiency may increase. Once the memory operations reach the end of the memory channel pipeline, the operations may have been ordered by a combination of QoS levels and memory bandwidth efficiency. High performance may be realized in some embodiments.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 (L1) caches and level 2 (L2) cache 18. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler/rotator circuitry, image compression/decompression circuitry, etc.

As mentioned above, the RT peripherals 22 may include the image processor 24 and the display pipes 26. The display pipes 26 may include circuitry to fetch one or more frames and to blend the frames to create a display image. The display pipes 26 may further include one or more video pipelines. The result of the display pipes 26 may be a stream of pixels to be displayed on the display screen. The pixel values may be transmitted to a display controller for display on the display screen. The image processor 26 may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g., source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WiFi) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

It is noted that other embodiments of the memory controller 40 may not implement multiple ports, but may still implement QoS parameters, different QoS parameters/levels for different traffic types or classes such as NRT and RT, and QoS upgrading.

Figure 2:
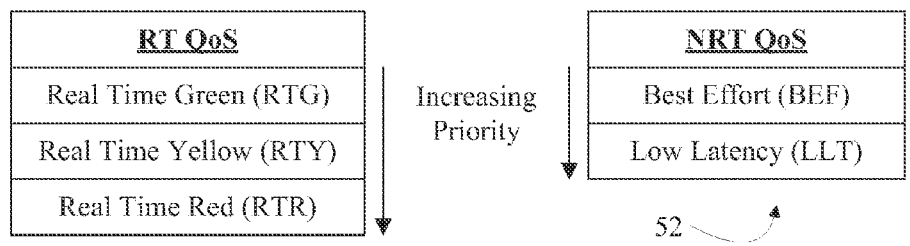
FIG. 2 is a block diagram of one embodiment of QoS levels that may be defined for RT and NRT classes of traffic.

Turning next to FIG. 2, a pair of tables 50 and 52 are shown illustrating a definition of a set of RT QoS levels and a set of NRT QoS levels, respectively, for one embodiment. Other embodiments may include additional or substitute levels, and other embodiments may include additional levels in combination with a subset of the illustrated levels. As illustrated by the arrows pointing downward next to the tables 50 and 52 in FIG. 2, the tables illustrate the QoS levels within a set in increasing priority. That is, the real time green (RTG) QoS level is the lowest priority RT QoS level; the real time yellow (RTY) QoS level is the medium priority RT QoS level; and the real time red (RTR) QoS level is the highest priority RT QoS level. Similarly, the best effort (BEF) QoS level is the lowest priority NRT QoS level and the low latency (LLT) QoS level is the highest priority NRT QoS level. The illustration of the RT QoS levels and the NRT QoS levels next to each other in FIG. 2 is not intended to indicate the relative priority of the RT QoS levels with regard to the NRT QoS levels. Instead, the memory controller 40 may determine such relative priorities based, in part, on other factors indicating the traffic that is being experienced by the memory controller 40 across the various types and ports.

The RTG, RTY, and RTR QoS levels may reflect relative levels of urgency from an RT source. That is, as the amount of time before data is needed by the RT source to prevent erroneous operation decreases, the QoS level assigned to each memory operation increases to indicate the higher urgency. By treating operations having higher urgency with higher priority, the memory controller 40 may return data to the RT source more quickly and may thus aid the correct operation of the RT source.

For example, the display pipe 26 may initiate the reading of frame data from the memory 12A-12B for the next frame to be displayed in the vertical blanking interval for the display. The frame is not actually displayed until the end of the vertical blanking interval, and thus the display pipe 26 may use the RTG level during this time period. As the frame begins to be displayed (i.e. the display controller begins reading frame pixels from the display pipe 26 output), the display pipe 26 may raise the QoS level of frame data read operations to the memory to the RTY level. For example, if the amount of frame data that is read ahead of the current pixel being displayed reduces below a first threshold, the level may be raised to RTY. At a second threshold (lower than the first threshold), the display pipe 26 may raise the QoS level of memory operations to RTR.

The BEF NRT QoS level may be a request to return the data as quickly as the memory controller 40 is able, once the needs of other flows of data are met. On the other hand, the LLT NRT QoS level may be a request for low latency data. NRT memory operations having the LLT QoS level may be treated more closely, in terms of priority with other memory transactions, than those having the BEF QoS level (at least in some cases). In other cases, the BEF and LLT QoS levels may be treated the same by the memory controller 40.

Figure 3:
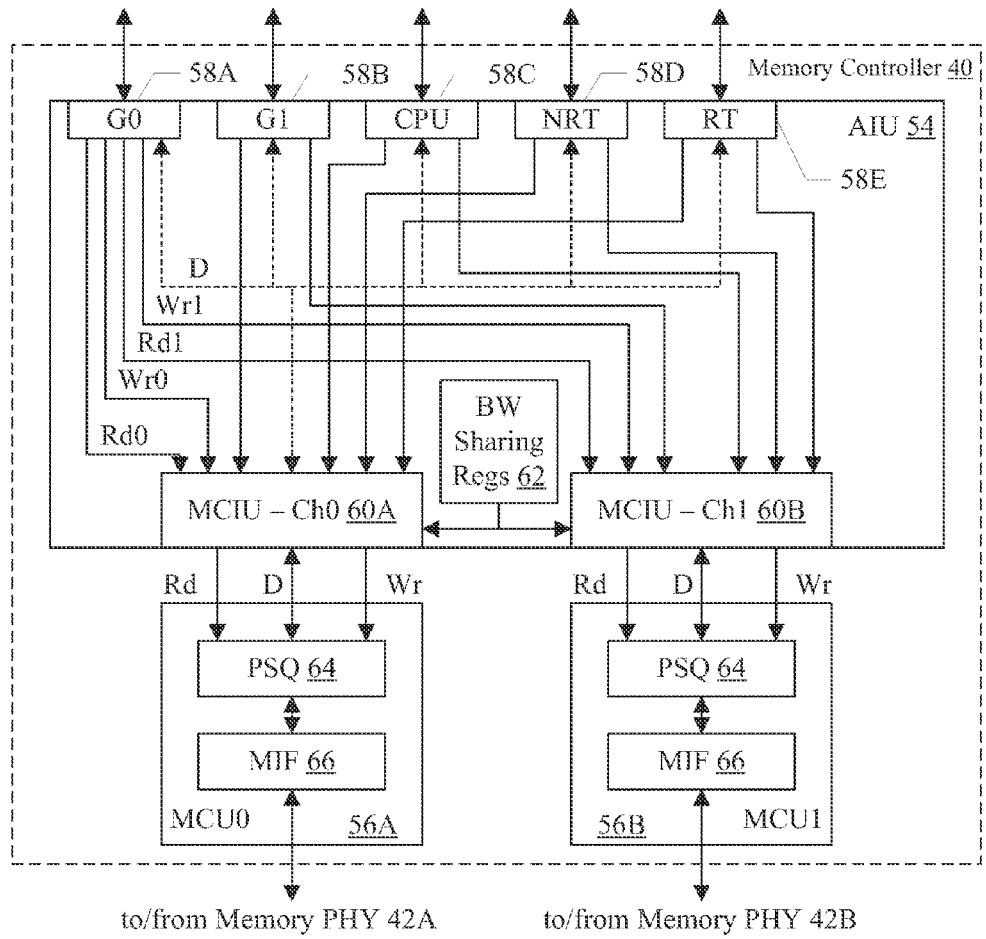
FIG. 3 is a block diagram of one embodiment of the memory controller shown in FIG. 1.

Turning next to FIG. 3, a block diagram of one embodiment of the memory controller 40 is shown. In the embodiment of FIG. 3, the memory controller 40 includes an agent interface unit (AIU) 54 and one or more memory channel units (MCUs) 56A-56B. There may be one MCU 56A-56B for each memory channel included in a given embodiment, and other embodiments may include one channel or more than two channels. As illustrated in FIG. 3, the AIU 54 may include multiple port interface units 58A-58E. More particularly, there may be a port interface unit 58A-58E for each port 44A-44E on the memory controller 40. The AIU 54 may further include memory channel interface units (MCIUs) 60A-60B (one for each MCU 56A-56B). The AIU 54 may further include one or more bandwidth sharing registers 62, which may be programmable to indicate how bandwidth is to be shared among the ports. The port interface units 58A-58E may be coupled to receive memory operations and to receive/transmit data and responses on the corresponding port, and may also be coupled to the MCIUs 60A-60B. The MCIUs 60A-60B may further be coupled to the bandwidth sharing registers 62 and to the corresponding MCU 56A-56B. As illustrated in FIG. 3, the MCUs 56A-56B may each include a presorting queue (PSQ) 64 and a memory interface circuit (MIF) 66. The PSQs 64 are coupled to the corresponding MCIUs 60A-60B and to the MIF 66 in the same MCU 56A-56B. The MIF 66 in each MCU 56A-56B is coupled to the corresponding memory PHY 42A-42B.

The AIU 54 may be configured to receive memory operations on the ports 44A-44E and to switch the memory operations to the channels addressed by those memory operations, using the QoS parameters of the memory operations as a factor in deciding which memory operations to transmit to one of the MCUs 56A-56B prior to other memory operations to the same MCU 56A-56B. Other factors may include the bandwidth sharing controls to divide bandwidth on the memory channels among the ports.

More particularly, each port interface unit 58A-58E may be configured to receive the memory operations from the corresponding port 44A-44E, and may be configured to determine the memory channel to which a given memory operation is directed. The port interface unit 58A-58E may transmit the memory operation to the corresponding MCIU 60A-60B, and may transmit reads separately from writes in the illustrated embodiment. Thus, for example, the port interface unit 58A may have a Rd0 connection and a Wr0 connection to the MCIU 60A for read operations and write operations, respectively. Similarly, the port interface unit 58A may have a Rd1 and a Wr1 connection to the MCIU 60B. The other port interface units 58B-58E may have similar connections to the MCIU 60A-60B. There may also be a data interface to transmit read data from the port interface units 58A-58E to the MCIUs 60A-60B, illustrated generally as the dotted "D" interface for the MCIU 60A in FIG. 3.

The MCIUs 60A-60B may be configured to queue the memory operations provided by the port interface units 58A-58E, and to arbitrate among the memory operations to select operations to transmit to the corresponding MCUs 56A-56B. The arbitration among operations targeted at a given memory channel may be independent of the arbitration among operations targeted at other memory channels.

The MCIUs 60A-60B may be coupled to the bandwidth sharing registers 62, which may be programmed to indicate how memory bandwidth on a channel is to be allocated to memory operations in the given channel. For example, in one embodiment, the MCIUs 60A-60B may use a deficit-weighted round-robin algorithm to select among the ports when there is no high priority traffic present (e.g., RTR or RTY QoS levels in the RT traffic). When RTR or RTY traffic is present, a round-robin mechanism may be used to select among the ports that have RTR/RTY traffic. The weights in the deficit weighted round-robin mechanism may be programmable to allocate relatively more bandwidth to one port than another. The weights may be selected to favor processor traffic over the graphics and NRT ports, for example, or to favor the graphics ports over other ports. Any set of weights may be used in various embodiments. Other embodiments may measure the bandwidth allocations in other ways. For example, percentages of the total bandwidth may be used. In other embodiments, a credit system may be used to control the relative number of operations from each port that are selected. Generally, however, operations may be selected based on both QoS parameters and on bandwidth sharing requirements in various embodiments.

In various embodiments, each MCIU 60A-B may be configured to monitor the number of outstanding memory operations in one or more queues. Additionally, each MCIU 60A-B may throttle the scheduling of NRT memory operations to the respective MCU 56A-B for a period of time in response to detecting a condition. As used herein, "throttling" generally means scheduling or servicing of given operations is temporarily ceased or otherwise reduced. For example, that rate at which such operations is serviced may be reduced, or the number which would otherwise be serviced in the absence of throttling is reduced. In various embodiments, the condition may be a number of outstanding memory operations in one or more queues exceeding a fixed or programmable threshold. In various embodiments, the MCIU 60 may monitor the number of outstanding memory operations in a single queue, multiple queues, or all of the queues of the MCIU 60. In another embodiment, the MCIU 60 or another component may monitor the number of outstanding memory operations in all of the queues of the memory controller 40.

In various embodiments, each MCIU 60 may maintain a memory operation counter (not shown) to keep track of the number of outstanding memory operations in one or more queues. In other embodiments, AIU 54 may maintain a memory operation counter to keep track of the number of outstanding memory operations in one or more queues. In these embodiments, AIU 54 may convey the value of the memory operation counter to the MCIU 60 to facilitate both the arbitration of memory operation scheduling and the determination of an event that triggers throttling of NRT memory operations. In further embodiments, one or more MCUs 56A-B may maintain a memory operation counter to keep track of the number of outstanding memory operations in one or more queues. In these embodiments, the MCU(s) 56 may convey the value of the memory operation counter to the MCIU 60 to facilitate both the arbitration of memory operation scheduling and the generation of a trigger condition to enable or disable throttling.

In other embodiments, other conditions may trigger the MCIU 60A-B to throttle the scheduling of NRT memory operations to the respective MCU 56A-B. For example, in various embodiments, one condition may be a high quality of service (QoS) situation. In one embodiment, the high QoS situation may be a red QoS situation. In another embodiment, the high QoS situation may be a green QoS situation. In other embodiments, other QoS situations may be interpreted as a high QoS situation. When the MCIU 60 detects a high QoS situation, the MCIU 60 may postpone the scheduling of NRT memory operations.

In various other embodiments, other conditions may trigger the MCIU 60 to throttle the scheduling of NRT memory operations to the respective MCU 56. In one embodiment, the condition may be a number of entries in one or more read outstanding transaction tables (ROTTs) of a port interface unit 58A-E exceeding a fixed or programmable threshold. The port interface units 58A-E may monitor the number of entries in their respective ROTTs, and if the number of entries in the ROTT exceeds the threshold, then the corresponding port interface unit 58 may notify the MCIU 60 of this condition. In response, each MCIU may defer the scheduling of NRT memory operations.

In another embodiment, a condition may be a number of outstanding memory operations in one or more pre-sorting queues (PSQs) 64 exceeding a fixed or programmable threshold. Each MCU 56 may monitor the number of memory operations stored in one or more of the PSQs, and when the number exceeds a fixed or programmable threshold, the MCU 56 may alert the respective MCIU 60 of this condition. In response to receiving this alert from the MCU 56, the MCIU 60 may throttle the scheduling of NRT memory operations to the MCU 56.

In the various embodiments in which the MCIU 60 throttles the scheduling of NRT memory operations, the duration of the throttling may be proportional to the number of memory operations in one or more of the various queues of the memory controller 40. In one embodiment, the throttling may be proportional to the number of total memory operations in the memory controller 40. In another embodiment, the throttling may be proportional to the number of memory operations in a single queue. This single queue may be any of the queues of the memory controller 40. In other embodiments, two or more queues may be monitored, and the duration of throttling may be proportional to the number of memory operations in these two or more queues.

In a further embodiment, a plurality of conditions associated with memory operations, the status of memory controller 40, and the status of one or more queues of memory controller 40 may be monitored. These monitored conditions may include: a number of outstanding memory operations, an average number of memory operations in one or more queues over a period of time, an average memory operation latency, and an average memory operation throughput. In various embodiments, the throttling of NRT memory operations may be proportional to any one or more of these conditions.

In various embodiments, the time period during which NRT transactions may be throttled may be tracked using a throttle counter. In various embodiments, a throttle counter may be used to track the duration proportional to the number of memory operations in one or more queues. For example, the throttle counter may be set to an initial value proportional to this number and decremented on a periodic (e.g., each clock cycle) basis. Alternatively, the counter may be decremented responsive to a memory operation being serviced. In one embodiment, the initial value of the throttle counter is set to be equal to two raised to a power equal to the number of outstanding memory operations in one or more queues ($2^N$). In other embodiments, other initial values and time periods may be used. For example, if the ROTT of a port interface unit coupled to an RT device is monitored, and it is determined that the ROTT contains 10 entries, then the throttle counter may be initialized to a value of $2^{10}=1024$. In an embodiment wherein the counter is decremented on a periodic basis, such as each clock cycle, the time period during which throttling is performed may correspond to a calculable period of time (e.g., 1024 clock cycles). Alternatively, in an embodiment in which the counter is decremented responsive to an operation being serviced (e.g., a real time operation), the time period during which throttling is performed may vary (i.e., servicing 1024 operations may take 1024 clock cycles or longer depending on other system conditions).

After the throttle counter is set to an initial value, the throttle counter may start running. The throttle counter may count down, and while the throttle counter is counting down, only RT memory operations may be scheduled. When the throttle counter expires, then one or more NRT memory operations may be scheduled. Then, it may be determined if the specific condition being monitored still exceeds the threshold, at which point the above-described process may be repeated. If the condition no longer exceeds the threshold, then the throttling of NRT memory operations may be terminated.

In one embodiment, throttling may be implemented by setting at least two separate variables. The first variable may be a number of clock cycles during which only one or more NRT memory operations may be scheduled. The first variable may also be referred to as a first throttling rate or a first rate. Alternatively, the first variable may be a number of times when a NRT memory operation is available for scheduling but the NRT memory operation is passed over due to throttling. The second variable may be the duration of time that the throttling is implemented. Either or both of the first and second variables may be set to values proportional to an amount associated with one of the monitored conditions previously described. In various embodiments, the values of the first and second variables may be proportional to two raised to a power of a number associated with a monitored condition. Alternatively, the product of the first and second variables may be set to a value proportional to a number associated with a monitored condition.

For example, in one embodiment, the first variable may be set to a value of 128, such that every 128 clock cycles, one NRT memory operation may be scheduled. The second variable may be set to 100, such that the throttling will go through 100 consecutive occurrences of the first variable counting through 128 clock cycles. In this case, the duration of throttling will last 12,800 clock cycles, and a total of 100 NRT memory operations will be scheduled during this time. This example is for illustrative purposes only, and the first and second variables may be set to various other values in other embodiments.

The MCUs 56A-56B may be configured to schedule memory operations from their queues to be transmitted on the memory channel. The MCUs may be configured to queue reads and writes separately in the PSQs 64, and may be configured to arbitrate between reads and writes using a credit based system, for example. In the credit-based system, requestors may be allocated a given number of credits for use in making requests (e.g., reads and writes). In such an embodiment, if a requestor has credits available, the requestor may issue a request and the available credits for the requestor is decremented. When a given request has been completed, the number of credits for the requestor may be increased/incremented. In one embodiment, the credit system may be part of the arbitration mechanism between reads and writes (along with measurements of the fullness of the write queue). That is, as the write queue becomes more full, the priority of the writes in the arbitration mechanism may increase. Additional details are set forth below.

In one embodiment, the QoS parameters of the write operations may be eliminated on entry into the PSQs 64. The read operations may retain the QoS parameters, and the QoS parameters may affect the read scheduling from the PSQs 64.

In an embodiment, the MCUs 56A-56B may schedule memory operations in bursts of operations (each operation in the burst consuming a credit). When the credit counts are increased later, the negative credits may be accounted for, and thus the total number of credits after increase may be less than the allocated credit amount.

To create bursts of memory operations for scheduling, the MCUs 56A-56B may group memory operations into affinity groups. A memory operation may be said to exhibit affinity with another memory operation (or may be said to be affine to the other memory operation) if the operations may be performed efficiently on the memory interface when performed in close proximity in time. Efficiency may be measured in terms of increased bandwidth utilization. For example, SDRAM memories are characterized by a page that can be opened using an activate command (along with an address of the page). The size of the page may vary from embodiment to embodiment, and generally may refer to a number of contiguous bits that may be available for access once the activate command has been transmitted. Asynchronous DRAM memories may similarly have a page that may be opened by asserting a row address strobe control signal and by providing the row address. Two or more memory operations that access data in the same page may be affine, because only one activate/RAS may be needed on the interface for the memory operations. SDRAM memories also have independent banks and ranks A bank may be a collection of memory cells within an SDRAM chip that may have an open row (within which page hits may be detected). A rank may be selected via a chip select from the memory controller, and may include one or more SDRAM chips. Memory operations to different ranks or banks may also be considered affine operations, because they do not conflict and thus do not require the page to be closed and a new page to be opened. Memory operations may be viewed as affine operations only if they transfer data in the same direction (i.e. read operations may only be affine to other read operations, and similarly write operations may only be affine to other write operations). Memory operations to the same page (or to an open page) may be referred to as page hits, and memory operations to different banks/ranks may be referred to as bank hits and rank hits, respectively.

The MCUs 56A-56B may also be configured to schedule commands on the memory interface to the memories 12A-12B (through the memory PHYs 42A-42B) to perform the scheduled memory operations. More particularly, in an embodiment, the MCUs 56A-56B may be configured to presynthesize the commands for each memory operation and to enqueue the commands. The MCUs 56A-56B may be configured to schedule the commands to provide efficient use of the memory bandwidth. The MIFs 66 in each MCU 56A-56B may implement the presynthesis of commands and the scheduling of the commands, in an embodiment.

Figure 4:
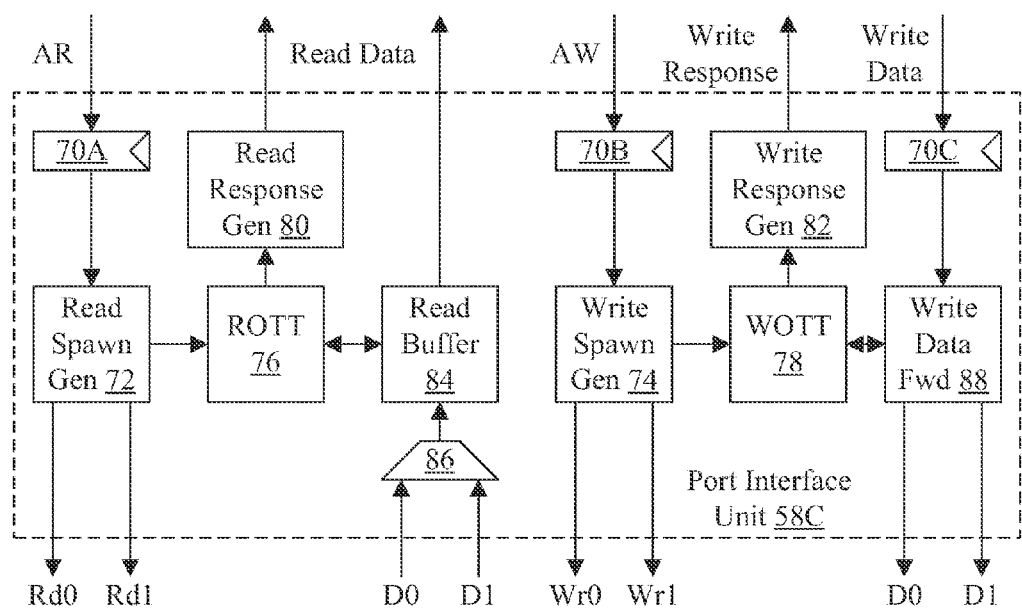
FIG. 4 is a block diagram of one embodiment of a port interface unit that may be included in one embodiment of an agent interface unit shown in FIG. 3.

Turning now to FIG. 4, a block diagram of one embodiment of the port interface unit 58C is shown. Other port interface circuits 58A-58B and 58D-58E may be similar, although there may be differences in implementation for port interface circuits that couple to different interfaces. In the illustrated embodiment, the port interface unit 58C includes buffers 70A-70B coupled to read (AR) and write (AW) interfaces to receive read and write memory operations, respectively, as illustrated in FIG. 4. The buffers 70A-70B are coupled to a read spawn generator 72 and a write spawn generator 74, respectively, which are coupled to the Rd0/Rd1 interfaces and the Wr0/Wr1 interfaces, respectively. The read spawn generator 72 is coupled to a read outstanding transaction table (ROTT) 76, and the write spawn generator 74 is coupled to a write outstanding transaction table (WOTT) 78. The ROTT 76 is coupled to a read response generator 80 which is configured to generate a read response on the interface. The ROTT is also coupled to a read buffer 84, which is coupled to receive data from either MCU 56A-56B through a mux 86 and to provide read data on the interface. The WOTT 78 is coupled to a write response generator 82 which is configured to generate a write response on the interface. The WOTT 78 is also coupled to a write data forward buffer 88, which is coupled to provide data to the MCUs 56A-56B and is coupled to receive data from a buffer 70C, which is coupled to receive write data from the interface.

For a read operation, the buffer 70A may be configured to receive the operation from the interface. The buffer 70A may be provided to capture the read operation and hold it for processing by the read spawn generator 72. In an embodiment, the buffer 70A may be a two entry "skid" buffer that permits a second operation to be captured in the event of delay for an unavailable resource to become available, for example, thus easing timing on propagating back pressure requests to the source(s) on the interface. The buffers 70B-70C may similarly be two entry skid buffers. Other embodiments may include additional entries in the skid buffers, as desired.

The read spawn generator 72 may be configured to decode the address of the read operation to determine which memory channel is addressed by the read operation. The read spawn generator 72 may be configured to transmit the read operation to the addressed memory channel via the Rd0 or Rd1 interface. In some embodiments, a read operation may overlap memory channels. Each read operation may specify a size (i.e. a number of bytes to be read beginning at the address of the operation). If the combination of the size and the address indicates that bytes are read from more than one channel, the read spawn generator 72 may be configured to generate multiple read operations to the addressed channels. The read data from the multiple read operations may be accumulated in the read buffer 84 to be returned to the source.

The read spawn generator 72 may also be configured to update the ROTT 76, allocating an entry in the ROTT 76 to track the progress of the read. Once the data has been received in the read buffer 84, the ROTT 76 may be configured to signal the read response generator 80 to generate a read response to transfer the data to the source. If read data is to be returned in order on the interface (e.g., according to the protocol on the interface), the data may remain buffered in the read buffer 84 until previous reads have been returned and then the ROTT 76 may signal the read response generator 80 to transfer the data. The ROTT 76 may be coupled to receive various status signals from the MCUs 56A-56B to update the status of the pending read operations (not shown in FIG. 4).

The buffer 70B, the write spawn generator 74, and the WOTT 78 may operate similarly for write operations. However, data is received rather than transmitted on the interface. The write data may be received in the write data forward buffer 88, and may be forwarded to the current location of the corresponding write operation. The WOTT 78 may signal for the write response once the write has been guaranteed to complete, terminating the writes on the interface with a write response earlier than might otherwise be possible.

It is noted that, while the embodiment illustrated in FIG. 4 includes an interface that conveys read and write memory operations separately (AR and AW, respectively), other embodiments may include a single transmission medium for both read and write operations. In such and embodiment, a single buffer 70 may receive the operations, and the read spawn generator 72 and the write spawn generator 74 may decode the command from the interface to differentiate read and write operations. Alternatively, there may be one spawn generator which generates both read and write operations and updates the ROTT 76 or the WOTT 78 accordingly.

Figure 5:
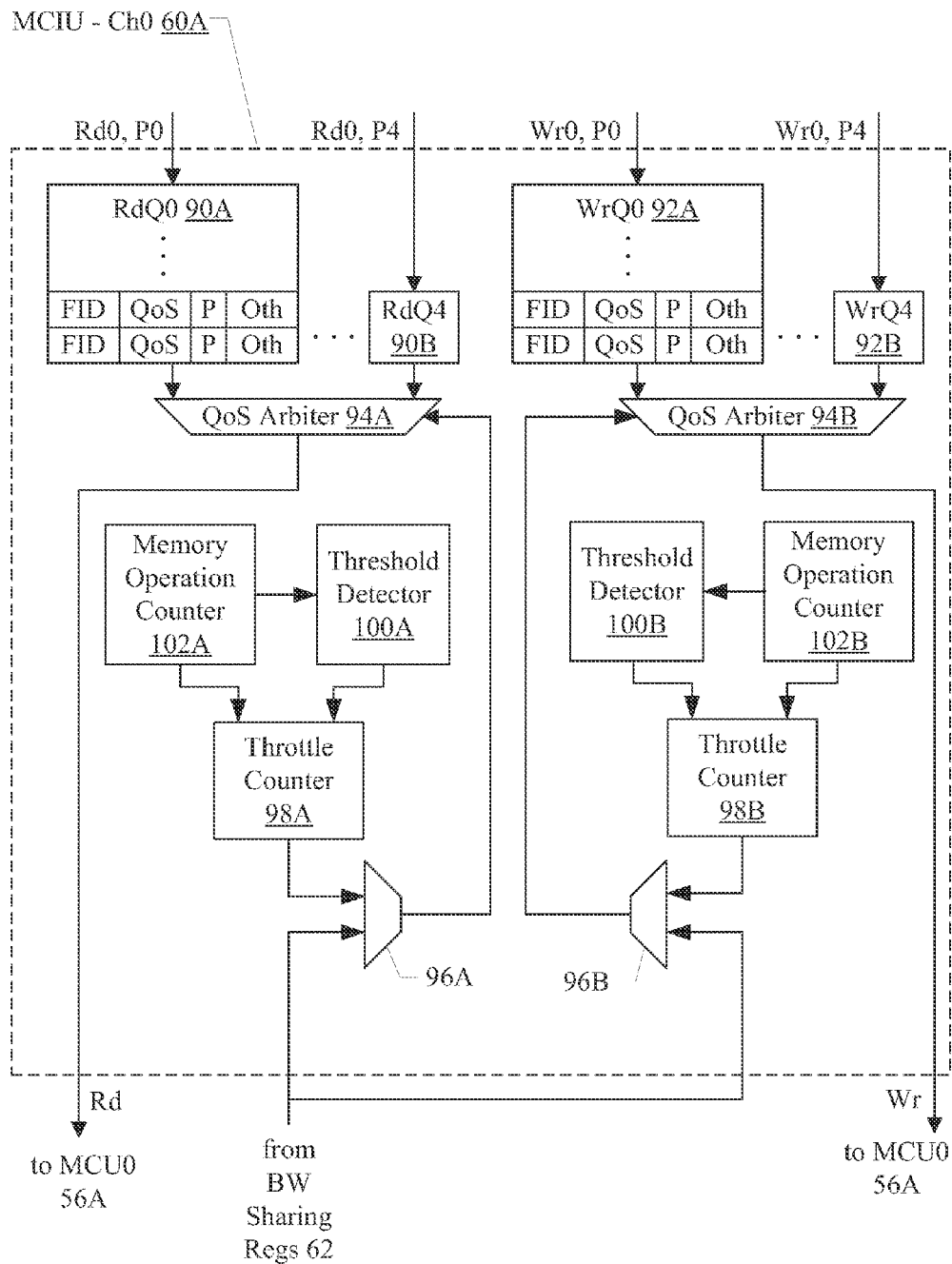
FIG. 5 is a block diagram of one embodiment of a memory channel interface unit that may be included in one embodiment of an agent interface unit shown in FIG. 3.

Turning now to FIG. 5, a block diagram illustrating one embodiment of the MCIU 60A is shown. The MCIU 60B may be similar except that it is coupled to receive the Rd1 and Wr1 inputs from each port and is coupled to the MCU 56B. In the illustrated embodiment, the MCIU includes a set of read queues such as read queues 90A-90B and a set of write queues such as write queues 92A-92B. There may be one read queue and one write queue for each port. Each read queue is coupled to the Rd0 output of one of the port interface units 58A-58E and is coupled to a QoS arbiter 94A. Each write queue is coupled to the Wr0 outputs of a respective one of the port interface units 58A-58E and to a QoS arbiter 94B. The outputs of the QoS arbiters 94A-94B are provided to the MCU 56A as read and write inputs, respectively. The QoS arbiters 94A-94B are coupled to receive data from multiplexers 96A-B, respectively. Multiplexers 96A-B may be coupled to the bandwidth sharing registers 62 and to the outputs of the throttle counter logic 98A-B, respectively. The logic for monitoring the state of queues and requests, and for scheduling and throttling of requests, may correspond to circuitry located in various locations of the memory controller. In some embodiments, portions of such logic may reside outside of the memory controller.

Two read queue entries are shown in the read queue 90A, and other read queues may be similar. The read queue 90A includes the FID of the memory operation, the QoS parameter of the operation, a push bit (P), and an other field (Oth). The FID and the QoS parameter may be the same values that were transmitted with the memory operation on the interface to the memory controller 40. Alternatively, one or both values may be recoded by the memory controller 40 for convenience internally. The push bit may be used to force a higher priority on the memory operation if a second memory operation is ordered behind the memory operation and is a higher QoS level than the memory operation. For example, the second memory operation may be received on the same port as the memory operation, and the interface on that port may require that data be returned in the same order that the memory operations are transmitted. By forcing the higher priority, the memory operation may be performed more quickly and may thus permit a more rapid servicing of the second memory operation with the higher QoS level. The other field may include various other information for the memory operation (e.g., the address, size information, etc.). Similarly, two write queue entries are shown in the write queue 92A, and may include fields similar to the read queue 90A. The other field may store different information for writes as compared to reads, if desired.

The QoS arbiters 94A-94B may arbitrate among the read queues 90A-90B and the write queues 92A-92B, respectively. If either of threshold detectors 100A-B has determined that a threshold has not been exceeded for a selected variable, then the respective QoS arbiter may take into account both QoS levels (as indicated by the QoS parameters in the queues) and the bandwidth sharing parameters from the bandwidth sharing registers. The selected read and write operation (if any) may be transmitted to the MCU 56A. If either of threshold detectors 100A-B has determined that a threshold has been exceeded, then the respective QoS arbiter may arbitrate among queues based on the output from throttle counters 98A-B. In various embodiments, the selected variable may be a number of outstanding memory operations in one or more queues, a QoS situation, a number of entries in one or more ROTTs or WOTTs, or another variable/condition.

Each memory operation counter 102A-B may monitor the selected variable, and the memory operation counter 102 may convey the value of the selected variable to the threshold detector 100 on a regular interval. Threshold detector 100 may determine if the value of counter 102 has exceeded a fixed or programmable threshold. Threshold detectors 100A-B may convey this determination to throttle counters 98A-B, respectively. Each of throttle counters 98A-B may be utilized as a timer, and throttle counters 98A-B may also be coupled to memory operation counters 102A-B, respectively. In one embodiment, if a threshold detector 100 notifies throttle counter 98 that a threshold has been exceeded, throttle counter 98 may be initialized to a value proportional to the value of memory operation counter 102. In various embodiments, the throttle counters 98A-B may be set to a value proportional to the number of outstanding memory operations in one or more queues of the memory controller. For example, in one embodiment, these queue(s) may include one or more queues of transaction queues 112 (of FIG. 6). In another embodiment, the queue(s) may include read queues 90A-B and/or write queues 92A-B. In various embodiments, the throttle counters 98A-B may be initialized to a value of two raised to a power equal to the value of memory operation counter 102. If the value of two raised to a power equal to the number of queue entries is greater than the size of the throttle counters 98A-B, then throttle counters 98A-B may be set to its maximum supported value.

After the throttle counters 98A-B are set to their initial values, the throttle counters 98A-B may be configured to count down. In one embodiment, the throttle counters 98A-B may count down on each clock cycle. In another embodiment, the throttle counters 98A-B may count down each time an event occurs. The event may be the scheduling of a memory operation or other type of event. While the throttle counters 98A-B is counting down, and before the throttle counters 98A-B expires, the MCIU 60A may schedule only RT memory operations. NRT memory operations may not be scheduled during the period of time when the counter is counting down and before the counter expires.

When the throttle counters 98A-B expires, the QoS arbiters 94A-B may schedule one or more NRT memory operations from each of the queues 90A-B and 92-B, respectively. Then, memory operation counters 102A-B may recalculate the number of pending memory operations in one or more queues, and then the throttle counters 98A-B may be reset to a value equal to two raised to a power equal to the value of memory operation counters 102A-B, respectively. Then the memory operation counters 102A-B may count down again, and while the counter is counting down, the QoS arbiters 94A-B may schedule only RT memory operations.

In various other embodiments, memory operation counters 102A-B, threshold detectors 100A-B, and/or threshold counters 98A-B may be located in other units (e.g., port interface unit, presorting queue) within memory controller 40. In another embodiment, multiplexer 96B, throttle counter 98B, threshold detector 100B, and memory operation counter 102B may be omitted, and bandwidth sharing registers may be coupled directly to QoS arbiter 94B. In this embodiment, throttling may only be implemented for read memory operations using read QoS arbiter 94A.

It is noted that, in some embodiments, there may be one or more bypass paths from a port interface unit to the QoS arbiters 94A and/or 94B (not shown in FIG. 5). For example, reads from the CPU port interface unit 58C may bypass to the QoS arbiter 94A to permit lower latency reads to the processors. In some embodiments, one or more memory operations in the queues 90A-90B and/or 92A-92B may be masked from the QoS arbiters 94A-94B. For example, write operations for which the corresponding data has not yet reached the memory controller 40 may be masked from the QoS arbiters 92A-92B, to avoid blocking write operations from other ports for which corresponding data has reached the memory controller 40.

In various embodiments, the MCIU 60A may detect any of a variety of conditions or events which may trigger a throttling of non-real-time (NRT) memory operations. In one embodiment, the MCIU 60A may detect a high QoS situation. In various embodiments, the MCIU 60A may utilize a variety of methods or mechanisms for detecting a high QoS situation. Additionally, the MCIU 60A may detect a long latency situation by monitoring the latency of memory operations that are passing through the memory controller. The MCIU 60A may determine the latency by monitoring the number of outstanding memory operations in one or more queues of the memory controller. In various embodiments, the queues may include read queues 90A-B (of FIG. 5), write queues 92A-B (of FIG. 5), and/or other queue. When it is detected that the latency is above a predetermined or programmable threshold, then the MCIU 60A may start throttling NRT memory operations. In some embodiments, throttling may be applied continuously and may not be dependent on a threshold.

Figure 6:
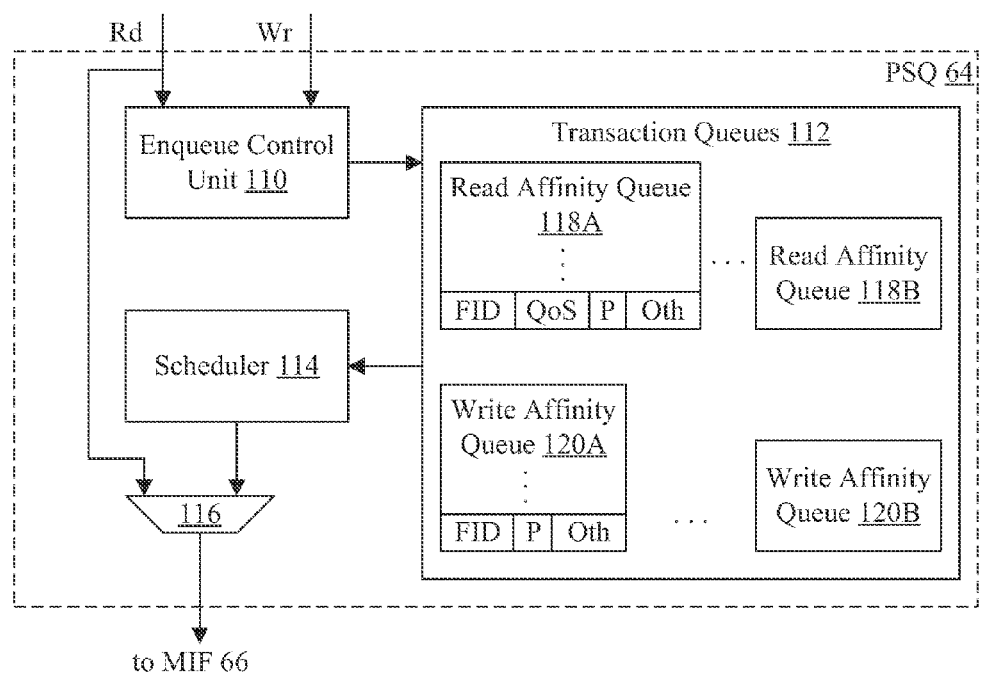
FIG. 6 is a block diagram of one embodiment of a pre-sorting queue (PSQ) illustrated in a memory channel unit in FIG. 3.

Turning now to FIG. 6, a block diagram of one embodiment of the PSQ 64 is shown. In the illustrated embodiment, the PSQ 64 includes an enqueue control unit 110, a set of transaction queues 112, a scheduler 114, and a bypass mux 116. The enqueue control unit 110 is coupled to receive the read and write operations from the corresponding MCIU 60A or 60B, and is coupled to the transaction queues 112. The transaction queues 112 are further coupled to the scheduler 114, the output of which is coupled to the bypass mux 116. The bypass mux 116 is coupled to receive the read operation as well, and is configured to select between the memory operation scheduled by the scheduler 114 and the read operation. For example, the read operation may bypass the transaction queues 112 if there are no reads in the transaction queues 112 and the number of writes is below a threshold level. Other embodiments may not implement bypassing and the bypass mux 116 may be eliminated.

As illustrated in FIG. 6, the transaction queues 112 may include a set of read affinity queues such as queues 118A-

118B and a set of write affinity queues such as queues 120A-120B. The number of read affinity queues and write affinity queues may vary from embodiment to embodiment, and the number of read affinity queues need not equal the number of write affinity queues. Each affinity queue may store one or more memory operations that have been determined by the enqueue control unit 110 to exhibit affinity with each other. Thus, as a memory operation is received by the enqueue control unit 110, the enqueue control unit 110 may be configured to compare the memory operation to the affinity queues 118A-118B (for a read operation) or the affinity queues 120A-120B (for a write operation). If the memory operation is affine, it may be enqueued in the corresponding affinity queue. If not, the memory operation may be enqueued in another affinity queue. In an embodiment, a read affinity queue may be reserved for reads that are not affine, and similarly a write affinity queue may be reserved for writes that are not affine.

The scheduler 114 may be configured to schedule memory operations to be transmitted to the MIF 66. For read operations, the scheduler 114 may be configured to consider both QoS levels in the read affinity queues 118A-118B and the number of affine memory operations in each read affinity queue 118A-118B. More details of one embodiment are described below. Generally, however, the scheduler 114 may be configured to favor read operations that have high QoS levels and larger numbers of affine memory operations. For write operations, the QoS levels may be eliminated in the PSQ 64. That is, the QoS levels of the write operations may be dropped as the write operations are written to the transaction queues 112. As illustrated in the exemplary entries in each of the queues 118A and 120A, the read operations may retain QoS while the write operations may not. The scheduler 114 may be configured to schedule between read operations and write operation based on fullness of the write queues and QoS levels in the read queues, for example. Additional details will be provided further below.

It is noted that, in some embodiments, the read affinity queues 118A-118B and write affinity queues 120A-120B may be physically instantiated (e.g., as separate data structures or as one or more data structures that are divided via logic circuitry in the PSQ 64 and/or programmably separated). In other embodiments, the affinity queues may be virtual. That is, there may be a read queue and a write queue, for example, and tagging may be used to identify affine operations.

Figure 7:
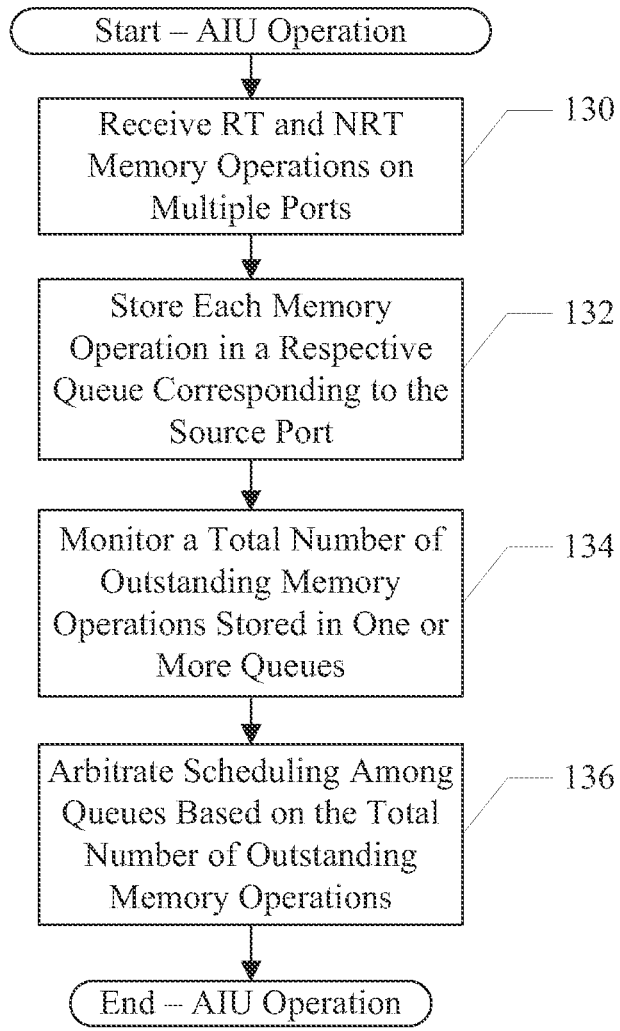
FIG. 7 is a flowchart illustrating operation of one embodiment of an agent interface unit.

Referring now to FIG. 7, a flowchart of one embodiment of operating an agent interface unit is shown. While blocks are shown in a particular order for ease of understanding, other orders may be used. It should be noted that in various embodiments of the method described below, one or more of the blocks described may be performed concurrently or may be omitted entirely, and other additional blocks may also be performed as desired. Blocks may be performed in parallel in combinatorial logic in the AIU 54 (of FIG. 3). Blocks, combinations of blocks, and/or the flowchart as a whole may be pipelined over multiple clock cycles. The AIU 54 may be configured to implement the operation illustrated in FIG. 7.

Memory operations may be received on multiple ports of a memory controller, and each received memory operation may be classified as either real-time (RT) or non-real-time (NRT) (block 130). In one embodiment, the memory operations may be received on a port interface unit within an AIU. After passing through a port interface unit, the memory operations may pass through one or more memory channel interface units (MCIUs). Within a respective MCIU, each memory operation may be stored in a respective queue corresponding to the source port on which the memory operation was received (block 132). In one embodiment, write memory operations may be stored in write queues and read memory operations may be stored in read queues. There may be a write queue and read queue within each MCIU corresponding to each port of the memory controller.

The total number of outstanding memory operations stored in one or more queues may be monitored (block 134). In one embodiment, the AIU may monitor the total number of outstanding memory operations. In another embodiment, the MCIU may monitor the total number of outstanding memory operations. In a further embodiment, another component may monitor the total number of outstanding memory operations. In one embodiment, all of the read queues and write queues of the MCIU may be monitored. In another embodiment, all of the queues of the memory controller may be monitored. In a further embodiment, only the read queues within the MCIU which correspond to RT ports may be monitored. In various embodiments, one or more of any of the queues within the MCIU may be monitored. After block 134, scheduling may be arbitrated among queues based on the total number of outstanding memory operations (block 136).

Figure 8:
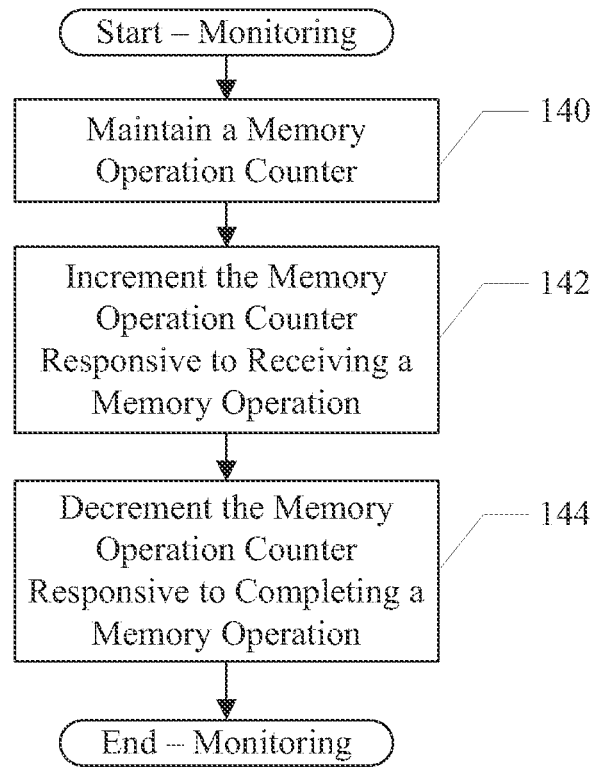
FIG. 8 is a flowchart illustrating operation of one embodiment of the monitoring block of FIG. 7.

Turning now to FIG. 8, a flowchart illustrating one embodiment of the monitoring block 134 shown in FIG. 7. While blocks are shown in a particular order for ease of understanding, other orders may be used. It should be noted that in various embodiments of the method described below, one or more of the blocks described may be performed concurrently or may be omitted entirely, and other additional blocks may also be performed as desired. Blocks may be performed in parallel in combinatorial logic in the MCIU 60A (of FIG. 5). Blocks, combinations of blocks, and/or the flowchart as a whole may be pipelined over multiple clock cycles. The MCIU 60A may be configured to implement the operation illustrated in FIG. 8.

A memory operation counter may be maintained in block 140. The memory operation counter may keep track of the total number of outstanding memory operations in one or more queues. In one embodiment, the memory operation counter may reside within the MCIU. In another embodiment, the memory operation counter may reside within the AIU. In a further embodiment, the memory operation counter may reside in another location. The memory operation counter may be incremented responsive to receiving a memory operation (block 142). In one embodiment, the memory operation counter may be incremented responsive to receiving a memory operation in a read queue or write queue within the MCIU. In other embodiments, the memory operation counter may be incremented responsive to receiving a memory operation in other queues or locations within the memory controller.

The memory operation counter may be decremented responsive to scheduling a memory operation to a respective memory channel unit (block 144). The QoS arbiter may dispatch a memory operation from a read queue or write queue to the respective memory channel unit as part of the arbitration scheme. In another embodiment, the memory operation counter may reside within a presorting queue, and the counter may be decremented responsive to scheduling a memory operation to a respective memory interface unit. In other embodiments, the memory operation counter may be decremented responsive to scheduling a memory operation to any subsequent unit in the memory controller pipeline from a preceding unit.

Figure 9:
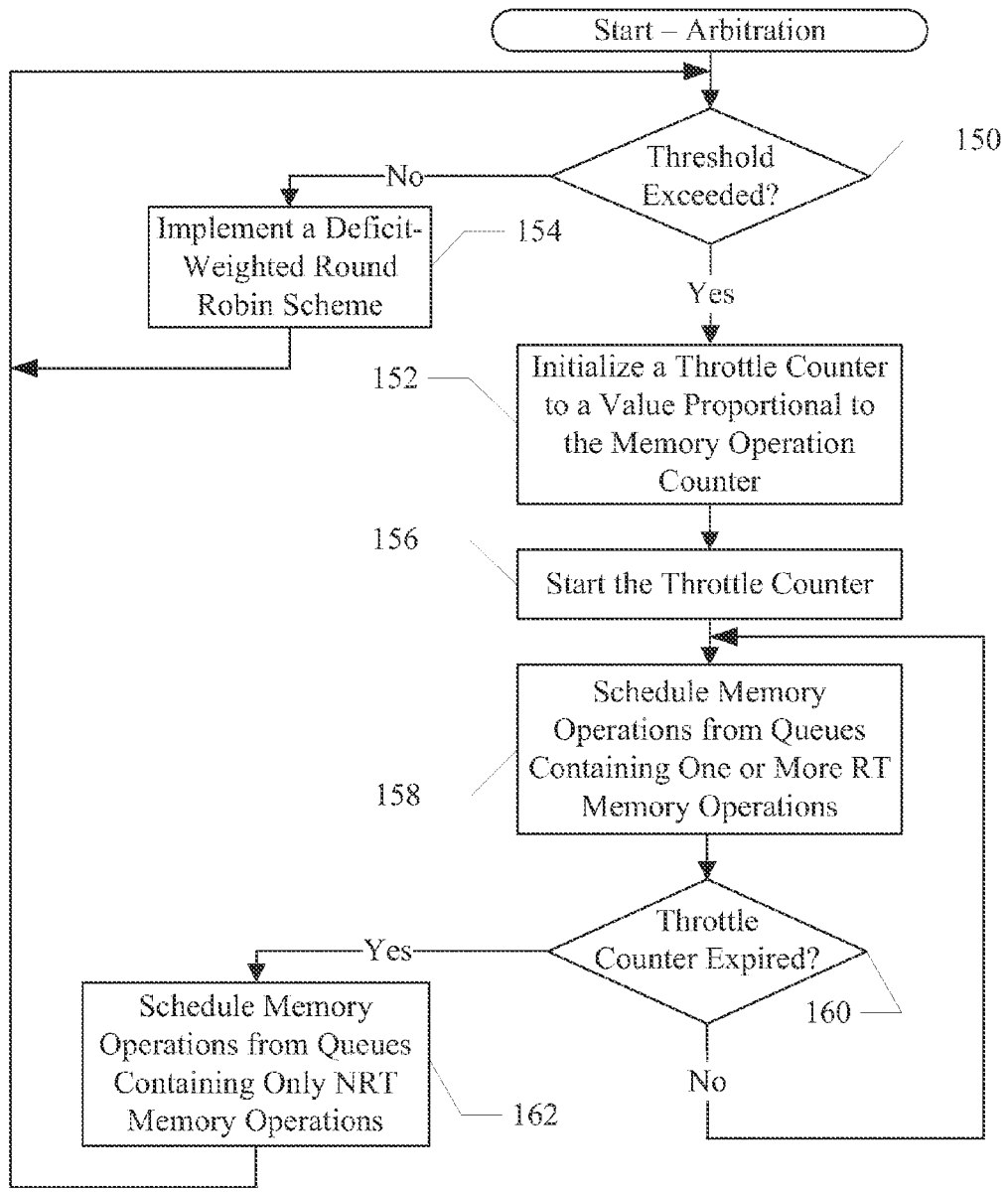
FIG. 9 is a flowchart illustrating operation of one embodiment of the arbitration block shown in FIG. 7.

Turning now to FIG. 9, a flowchart illustrating one embodiment of the arbitration block 136 shown in FIG. 7. While blocks are shown in a particular order for ease of understanding, other orders may be used. It should be noted that in various embodiments of the method described below, one or more of the blocks described may be performed concurrently or may be omitted entirely, and other additional blocks may also be performed as desired. Blocks may be performed in parallel in combinatorial logic in the QoS Arbiter 94A and/or 94B (of FIG. 5). Blocks, combinations of blocks, and/or the flowchart as a whole may be pipelined over multiple clock cycles. The QoS Arbiter 94A may be configured to implement the operation illustrated in FIG. 9. Additionally, the QoS Arbiter 94B may be configured to implement the operation illustrated in FIG. 9.

A specific value may be monitored to determine if a fixed or programmable threshold has been exceeded (conditional block 150). In one embodiment, the specific value being monitored may be a number of outstanding memory operations in one or more queues. In various embodiments, various different methods and mechanisms may be utilized for monitoring the number of outstanding memory operations. In one embodiment, when the AIU dispatches a memory operation to the MCU, a memory operation counter may be incremented. When the MCU has completed the transaction, then the memory operation counter may be decremented. Variations on the implementation of a memory operation counter are possible and are contemplated. In another embodiment, the specific value being monitored may be a QoS situation. In a further embodiment, the specific value being monitored may be a number of entries in a ROTT. In a still further embodiment, the specific value being monitored may be a number of outstanding memory operations in one or more presorting queues.

If it is determined that the threshold has been exceeded (conditional block 150), then a throttle counter may be initialized to a value proportional to the current amount of the memory operation counter (block 152). In various embodiments, the throttle counter may be initialized to a value of two raised to a power equal to the memory operation counter. In one embodiment, the throttle counter may be located within the MCIU. The throttle counter may be invoked as a timer to control the duration of time when the scheduling of NRT memory operations is deferred. If it is determined that the threshold has not been exceeded (conditional block 150), then the QoS arbiter may implement a deficit-weighted round robin scheme among the queues (block 154), where the weights may be based on the bandwidth sharing parameters (or the bandwidth sharing parameters may be the weights). Other embodiments may implement other arbitration schemes among the queues.

After block 152, the throttle counter may be started (block 156). In one embodiment, the throttle counter may be decremented on the rising and/or falling edge of each clock cycle. In another embodiment, the throttle counter may be decremented each time a memory operation is dispatched to a respective memory channel unit. In other embodiments, the throttle counter may be decremented based on other events. In a further embodiment, a throttle counter may count up instead of down, and the throttle counter may expire when it reaches a value proportional to the value of the memory operation counter.

After block 156, one or more memory operations may be scheduled from each queue containing one or more RT memory operations (block 158). Alternatively, one or more memory operations may be scheduled from the queue containing the highest QoS RT memory operation. Then, if it is determined that the throttle counter has expired (conditional block 160), then one or more memory operations may be scheduled from each queue containing only NRT memory operations (block 162). Alternatively, one or more memory operations may be scheduled from the queue containing the highest QoS NRT memory operation among the queues containing only NRT memory operations. If it is determined that the throttle counter has not expired (conditional block 160), then the method may return to block 158 to schedule one or more memory operations from each queue containing one or more RT memory operations. After block 162, the method may return to conditional block 150 to determine if the threshold has been exceeded.

In various embodiments, the scheduling of memory operations from the queues may be based on a credit system. That is, each queue of the MCIU may be assigned a certain number of credits. A scheduled memory operation may consume one credit from the corresponding credit count. In one embodiment, once the credits are exhausted for a queue associated with a RT port and a RT memory operation is scheduled, the credits for all queues of the MCIU may reload by adding the initial credit values to the current counts.

In one embodiment, throttling may be initiated if the following four conditions are met: (1) if one or more ROTTs of any of the various ports are filled above a programmable threshold, (2) if a transaction is waiting in the respective input skid buffer, (3) if the respective read data buffer does not contain enough data to keep the read data bus fully occupied, and (4) if the respective port still has credits remaining. If these four conditions are met, then credit reloading of QoS arbiters for the NRT ports may be throttled. In some embodiments, QoS arbiters may be programmed to wait for a programmable amount of time before responding to the above four conditions. The throttling may be stopped when one of the above four conditions has changed. In one embodiment, while the credit reloading for the NRT ports is throttled, if the NRT ports run out of credits, the NRT ports may be scheduled by QoS arbiters at a rate inversely proportional to the fill level of the respective PSQ queues.

In another embodiment, throttling may be initiated based on the latency of memory operations. For example, when the RT or CPU port has a memory operation with a high QoS parameter (e.g., RTR, RTY, Push bit set) stored in the respective input skid buffer and the memory operation waits more than a programmable amount of time, then throttling may be initiated on the other ports of the memory controller for a programmable period of time. In a still further embodiment, if a memory operation at any port of the memory controller has to wait more than a programmable amount of time, then the credit reloading of the other ports of the memory controller may be blocked for a programmable period of time.

Figure 10:
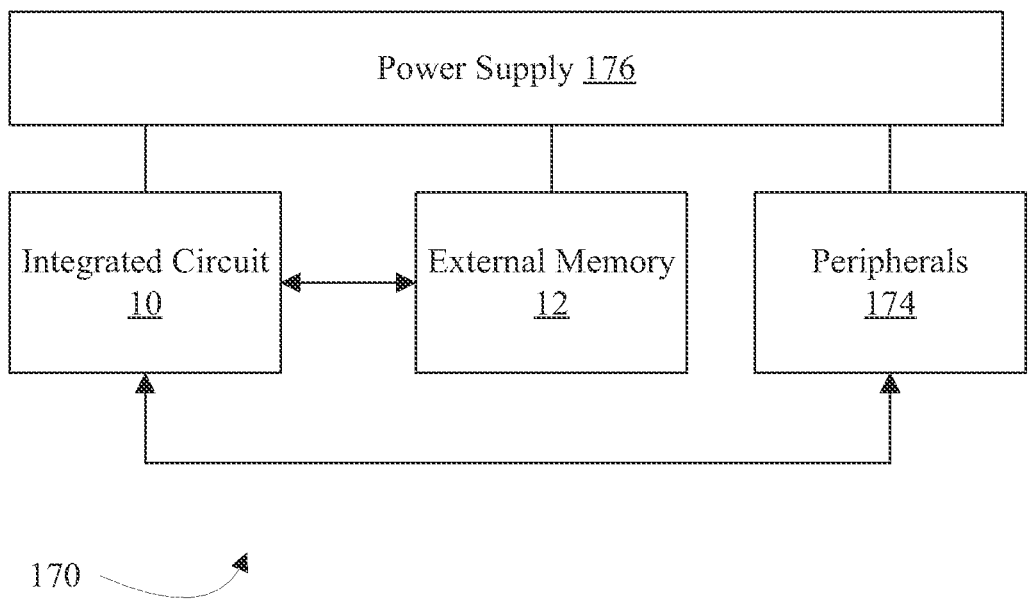
FIG. 10 is a block diagram of one embodiment of a system including an integrated circuit illustrated in FIG. 1.

Turning next to FIG. 10, a block diagram of one embodiment of a system 170 is shown. In the illustrated embodiment, the system 170 includes at least one instance of the integrated circuit 10 coupled to external memory 12 (e.g., the memory 12A-12B in FIG. 1). The integrated circuit 10 is coupled to one or more peripherals 174 and the external memory 12. A power supply 176 is also provided which supplies the supply voltages as well as one or more supply voltages to the integrated circuit 10, memory 12, and/or the peripherals 174. In other embodiments, more than one power supply 176 may be provided. In some embodiments, more than one instance of the integrated circuit 10 may be included (and more than one external memory 12 may be included as well).

The peripherals 174 may include any desired circuitry, depending on the type of system 170. For example, in one embodiment, the system 170 may be a mobile device (e.g., personal digital assistant (PDA), smart phone, electronic reading device) and the peripherals 174 may include devices for various types of wireless communication, such as wifi, Bluetooth, cellular, global positioning system, etc. The peripherals 174 may also include additional storage, including RAM storage, solid state storage, or disk storage. The peripherals 174 may include user interface devices such as a display screen, including touch display screens or multitouch display screens, keyboard or other input devices, microphones, speakers, etc. In other embodiments, the system 170 may be any type of computing system (e.g., desktop personal computer, laptop, workstation, nettop).

Numerous variations and modifications will become apparent to those skilled in the art once the above disclosure is fully appreciated. It is intended that the following claims be interpreted to embrace all such variations and modifications.

What is claimed is:

1. A memory controller comprising:
   an interface coupled to receive a plurality of memory operations from one or more sources, each of the plurality of memory operations having an associated quality of service (QoS) parameter assigned by a source of the corresponding memory operation, the memory operations comprising memory operations of at least a first type and a second type;
   one or more queues configured to store received memory operations; and
   logic configured to:
      monitor one or more conditions associated with memory operations;
      maintain a count of a number of outstanding memory operations in the one or more queues; and
      in response to detecting a given condition:
         initialize a throttle counter to an initial value proportional to the count, wherein the initial value indicates a duration of time for throttling scheduling of at least one type of memory operation;
         decrement the throttle counter;
         responsive to detecting the throttle counter exceeds a given count:
            throttle scheduling of memory operations of the second type for servicing; and
            service operations of the first type; and
         responsive to detecting the throttle counter does not exceed the given count, cease throttling of scheduling the memory operations of the second type.

2. The memory controller as recited in claim 1, wherein the given condition includes at least one of a number of outstanding memory operations, an average number of memory operations in the one or more queues, an average memory operation latency, and an average memory operation throughput.

3. The memory controller as recited in claim 1, wherein the associated QoS parameters remain unchanged during said duration of time in response to detecting the given condition.

4. The memory controller as recited in claim 1, wherein operations of the first type have a QoS parameter selected from a plurality of QoS parameters, and wherein the logic is configured to throttle scheduling memory operations of the second type in further response to detecting a QoS parameter corresponding to memory operations of the first type has increased to a relatively high QoS parameter of the plurality of QoS parameters.

5. The memory controller as recited in claim 1, wherein said logic comprises a QoS arbiter configured to arbitrate servicing of memory operations based at least in part on QoS parameters associated with the respective memory operations.

6. The memory controller as recited in claim 1, wherein the memory operation counter maintains a number of outstanding read and write operations of only the first type.

7. The memory controller as recited in claim 6, wherein the memory operation counter further maintains a number of outstanding read operations of only the first type.

8. The memory controller as recited in claim 1, wherein the throttle counter decrements from the initial value to the given count either on every clock cycle or each time a memory operation in one of said queues is serviced.

9. A memory controller comprising:
   an agent interface unit coupled to receive a plurality of memory operations from one or more sources, each of the plurality of memory operations having an associated quality of service (QoS) parameter assigned by a source of the corresponding memory operation, wherein each memory operation of the plurality of memory operations are classified according to one of at least two traffic classes;
   one or more memory channel units, wherein each of the one or more memory channel units is configured to interface to memory on a respective memory channel of one or more memory channels;
   wherein the agent interface unit is configured to:
      schedule memory operations to each memory channel unit; and
      maintain a count of a number of outstanding memory operations; and
      in response to detecting a given condition:
         initialize a throttle counter to an initial value proportional to the count, wherein the initial value indicates a duration of time for throttling the scheduling of at least one type of memory operation;
         decrement the throttle counter;
         responsive to detecting the throttle counter exceeds the given count:
            throttle scheduling of memory operations of the second class for servicing; and
            service operations of the first class; and
         responsive to detecting the throttle counter does not exceed the given count, cease throttling of scheduling the memory operations of the second type.

10. The memory controller as recited in claim 9, wherein the given condition includes at least one of a number of outstanding memory operations, an average number of memory operations in one or more queues, an average memory operation latency, and an average memory operation throughput.

11. The memory controller as recited in claim 9, wherein a first traffic class is a real-time (RT) class and the second traffic class is a non-real-time (NRT) class, wherein the memory controller is configured to service memory operations of the RT class with a lower latency than that of memory operations of the NRT class.

12. The memory controller as recited in claim 11, wherein the agent interface unit further comprises one or more memory channel interface units, wherein each memory channel interface unit is coupled to a respective memory channel unit, and wherein each memory channel interface unit comprises a read queue and a write queue for each source, wherein both the read queue and the write queue are configured to store operations of both the RT class and the NRT class, and wherein the agent interface unit is configured to schedule memory operations from any read queues containing one or more memory operations of the RT class during said duration of time.

13. The memory controller as recited in claim 9, wherein the associated QoS parameters remain unchanged during said duration of time in response to detecting the given condition.

14. A method comprising:
- an interface receiving a plurality of memory operations from one or more sources, each of the plurality of memory operations having an associated quality of service (QoS) parameter assigned by a source of the corresponding memory operation, the memory operations comprising memory operations of at least a first type and a second type;
- queuing received memory operations in one or more queues;
- monitoring one or more conditions associated with memory operations; and
- maintaining a count of a number of outstanding memory operations in the one or more queues; and
- in response to detecting a given condition:
  - initializing a throttle counter to an initial value proportional to the count, wherein the initial value indicates a duration of time for throttling the scheduling of at least one type of memory operation;
  - responsive to detecting the throttle counter exceeds the given count:
    - throttling scheduling of memory operations of the second type for servicing; and
    - servicing operations of the first type; and
  - responsive to detecting the throttle counter does not exceed the given count, cease throttling of scheduling the memory operations of the second type.

15. The method as recited in claim 14, wherein said given condition includes at least one of a number of outstanding memory operations, an average number of memory operations in the one or more queues, an average memory operation latency, and an average memory operation throughput.

16. The method as recited in claim 14, wherein the memory operation counter value is a number of outstanding read operations of only the first type.

17. The method as recited in claim 14, wherein memory operations of the first type correspond to real time (RT) operations, and memory operations of the second type correspond to non-real time (NRT) operations, wherein the method comprises servicing memory operations of the RT class with a smaller latency than that of memory operations of the NRT class.

18. The method as recited in claim 14, wherein decrementing from the initial memory operation counter value to the given count occurs either on every clock cycle or each time a memory operation in one of said queues is serviced.

19. A system comprising:
- one or more real-time (RT) devices configured to transmit a plurality of memory operations, each of the plurality of memory operations having an associated quality of service (QoS) parameter assigned by a source of the corresponding memory operation;
- one or more non-real-time (NRT) devices configured to transmit a plurality of memory operations; and
- a memory controller coupled to the one or more RT devices and the one or more NRT devices, wherein the memory controller is configured to:
  - service memory operations corresponding to an RT device with a lower latency than that of memory operations corresponding to an NRT device;
  - receive the plurality of memory operations from the RT devices and the NRT devices;
  - store the plurality of memory operations in one or more queues;
  - monitor one or more conditions associated with the plurality of memory operations; and
  - maintain a count of a number of outstanding memory operations in the one or more queues; and
  - in response to detecting a given condition:
    - initialize a throttle counter to an initial value proportional to the count, wherein the initial value indicates a duration of time for throttling the scheduling of at least one type of memory operation;
    - decrement the throttle counter;
    - responsive to detecting the throttle counter exceeds the given count:
      - throttle scheduling of NRT memory operations for servicing; and
      - service RT operations; and
    - responsive to detecting the throttle counter does not exceed the given count, cease throttling of scheduling the NRT memory operations.

20. The system as recited in claim 19, wherein said given condition includes at least one of a number of outstanding memory operations, an average number of memory operations in the one or more queues, an average memory operation latency, and an average memory operation throughput.

21. The system as recited in claim 19, wherein the memory controller is further configured to maintain a separate credit count for each device coupled to the memory controller, wherein scheduling decisions are based, at least in part, on a credit count of a corresponding device.

22. The system as recited in claim 19, wherein the associated QoS parameters remain unchanged during said duration of time in response to detecting the given condition.

23. The system as recited in claim 19, wherein the memory operation counter value is a number of outstanding read RT memory operations.

* * * * *